Patented Feb. 16, 1932

1,845,339

UNITED STATES PATENT OFFICE

CLARENCE R. REX, OF TOLEDO, OHIO

COATING BODY

No Drawing.    Application filed March 2, 1928.    Serial No. 258,691.

This invention relates to coating and pigment bodies or carriers.

This invention has utility as a non-metallic mineral base for a coating.

In the burning of lime, more particularly in shaft kilns and in regions where the raw material is a dolomite, certain portions of the kiln charge, after undergoing the heat operation, come through the kiln in a condition normally rejected as a burnt or quick lime. In practice, this material is readily culled out due to its degree of hardness. It gives a resonance upon being struck by a hammer. This is a mode of culling out this material from the regularly produced quick lime. In accordance with the invention hereunder, this culled-out lime is the preferred material of value for this pigment body invention.

This stone-like resonant material, as discharged from the burning operation of the shaft kilns, in its substance may carry superficially some calcined material in the form of calcium oxid, but it is generally particles of calcium carbonate and magnesium oxid. This substance is treated with a spray of water or in a steam chamber under pressure to bring the temperature up to 180° to 200° F. Under this treatment, such superficial or clinging portions of the calcium oxid are converted into calcium hydrate. The material is then rumbled or given a shaking treatment thereby removing this white powder, the calcium hydrate. This material is of a considerable degree of fineness, approximately 95% passing a 200 mesh per square inch sieve. Experience has shown it is desirable to have a fineness of 85% to pass through a sieve 325 mesh to the square inch.

The retained portion of the calcium carbonate and magnesium oxid is dried out by heat or hot gases and ground in a Bonnet or ball mill, to a fineness to pass through a sieve of 325 mesh per square inch. This subdivided material is exposed to current carrying carbon dioxid gas thus to recarbonate any trace of calcium hydrate which may not have been removed by the rumbling operation.

At this stage there is mixed with this finely subdivided calcium-carbonate-magnesium-oxid, a minor quantity of calcium magnesium hydrate. The hydrate is preferably subjected to a similar subdividing treatment as given the calcium-carbonate-magnesium-oxid, so that its dimension shall approach the range of passing through a sieve 325 mesh to the square inch.

The mechanically thoroughly commingled calcium-carbonate-magnesium-oxid and the calcium-magnesium-hydrate has now combined therewith in the dry state, hydrous aluminum silicate in such a weathered or softened condition that it may readily go into suspension when put into water. This silicate is of a suspension promoting colloid character and is desirably introduced in a proportion of about 5% by weight as to the total of the calcium-carbonate-magnesium-oxid and the mixture therewith of the calcium-magnesium-hydrate.

To promote binding or skin-producing film-action of this base material there is imparted thereto attributes of a coating body within the invention. To this end there is introduced into this definite base material an albuminous medium which may be dried blood, egg albumen or casein. This binding medium or albuminous material is in quantity not to exceed 15% by weight of the total of the mixture of the calcium-carbonate-magnesium-oxid and the calcium-magnesium-hydrate together with the silicate.

The range within these disclosed proportions is definitely solved by letting:

$w$ equal the calcium carbonate magnesium oxid;

$x$ equal the calcium hydrate magnesium hydrate;

$y$ equal the hydrous aluminum silicate;

$z$ equal the albuminous material.

With $y$ about 5% of $w$ plus $x$, $z$ not to exceed 15% by weight of $w$ plus $x$ plus $y$, and preferably about half by weight of $x$, there is the equation: $x/2$ may equal $.15w$ plus $.15x$ plus $.15y$.

Eliminating $y$: $x/2$ may equal $.15w$ plus $.15x$ plus $.15$ $(.05w$ plus $.05x)$.

Clearing parenthesis: $x/2$ may equal $.15w$ plus $.15x$ plus $.0075w$ plus $.0075x$.

Clearing denominator: $x$ may equal $.3w$ plus $.3x$ plus $.015w$ plus $.015x$.
Transposing: $x$ minus $.315x$ may equal $.315w$.
Consolidating: $.685x$ may equal $.315w$.
Solving: $x$ may equal $315w/685$ equals $.46w$.
The body disclosed comprises: $w$ plus $x$ plus $y$ plus $z$ equals $100\%$.
Substituting to eliminate $x, y, z$: $w$ plus $.46w$ plus $5\%$ ($w$ plus $.46w$) plus $.23w$ equals $100$.
Clearing parenthesis: $w$ plus $.46w$ plus $.073w$ plus $.23w$ equals $100$.
Consolidating: $1.763w$ equals $100$.
Solving: $w$ equals $57\%$ minus, $x$ equals $.46w$ equals $26\%$ plus, $y$ equals $5\%$ ($w$ plus $x$) equals $4\%$ plus, $z$ equals $x/2$ equals $13\%$ plus.

The range for conditions is preserved with $w$ $80\%$, $x$ $10\%$, $y$ $4\frac{1}{2}\%$, $z$ $5\frac{1}{2}\%$. Dolomite may be taken as approximately $60\%$ calcium carbonate and $40\%$ magnesium carbonate, with atomic weights Ca 40, Mg 24, C 12, O 16, and molecular masses 100 and 84 respectively. Approximately six molecules of calcium carbonate are present to five molecules of magnesium oxid (molecular weight 40). The dolomite which is burned as herein disclosed to retain the calcium carbonate and carry the magnesium as an oxid is three-fourths calcium carbonate, or $42\%$ to $60\%$ in the above range of examples. Furthermore, this binding medium is not to be in excess of that of the calcium-magnesium-hydrate and desirably about half by weight of the quantity of the calcium-magnesium-hydrate.

This dry mixture of materials is at least partially water soluble in its initial wetting, if it be desired to apply the pigment as a water paint even with the addition of a pigment. This substance, even when used with a water medium, is one drying to a waterproof body or film producing substance which develops great strength. The hydrate cooperates in promoting a combination in the mixture the hydrate has reaction properties tending to promote suspension.

This material may be an albuminoid-calcium-magnesium silicate, which definite body in the presence of water may be mixed with linseed oil, tung oil, turpentine, petroleum, benzol, xylol, naphtha, and ethereal oils, such as oil of spike, lavender, balsam, cedar, etc. This body in this state of suspension is a definite coating material hereunder. When an oil is used the coating may be thinned down with petroleum to produce an oily, elastic, film or body of value even in outdoor as well as indoor work, either on wood or metal. The benzol improves the penetration properties, especially on wood or on fine joints of metal or iron work and is effective against rust or corrosive action on metals and is a preservative in its action as to wood as against rotting and fungus growth.

The filler when incorporated into vehicles is flexible, easily applied, and resistant to fire and water. It may be applied to brick walls, damp concrete or dry concrete as well as wooden walls and plastered walls. It is not affected by ammonia fumes. It is of a body making it an effective size even for fresh plaster or white finish walls, upon which this definite body even as suspended in linseed oil can be applied when the walls are wet or green and does not defeat the regular curing or recarbonization of the plaster in the walls in the normal way. Upon a smooth or built up base, this material may give an enamel luster which may be combined with various pigments to give any desired coloring effect. The coating may be even applied to plaster board having the paper base, or even paper surfaces whereon it will provide a base resistant to weathering action or bleaching or even wide changes of temperature—heat or cold.

This coating material may also be used as a size or primer coat for receiving the common oil paints. To this end the material replaces glue size, varnish size, shellac size. Besides this material as a size, has properties of flat coat or base and thereover as a primer it may produce a beautiful luster or sheen, not secured with other sizing or priming coats.

The material can be sprayed through an ordinary or usual type of a finely set spray gun. When brush applied it freely flows and spreads for working with such attributes of a high grade oil paint.

What is claimed and it is desired to secure by Letters Patent is:

1. A coating composition mechanically free from calcium oxid, said composition consisting of alkaline earth carbonate, alkaline earth hydrate, hydrous aluminum silicate, the carbonate being in major proportion, the hydrate in less proportion than the carbonate and the silicate in less proportion than the hydrate, the silicate being not in excess of approximately five percent by weight of the alkaline earth compounds; an albuminous material in quantity not to exceed fifteen percent by weight of the alkaline earth materials and silicate, and the addition of a liquid in sufficient quantity to permit application as a coating.

2. A coating composition consisting of alkaline earth calcined carbonate material freed from readily reacting oxid; alkaline earth hydrate, hydrous aluminum silicate in the state of a ready water suspension colloid; the carbonate being in major proportion, the hydrate in less proportion than the carbonate and the silicate in less proportion than the hydrate, the silicate being not in excess of approximately five percent by weight of the alkaline earth compounds; an albuminous material in quantity not to exceed fifteen percent by weight of the alkaline earth materials and silicate, and the addition of a liquid in sufficient quantity to permit application as a coating.

3. A coating composition consisting of alkaline earth carbonate material, calcined and freed from readily reacting oxid; alkaline earth hydrate, hydrous aluminum silicate, the carbonate being in major proportion, the hydrate in less proportion than the carbonate, and the silicate in less proportion than the hydrate, the silicate being not in excess of approximately five percent by weight of the alkaline earth compounds; albuminous material in quantity up to about half by weight of the hydrate, and the addition of a liquid in sufficient quantity to permit application as a coating.

4. A coating composition consisting of alkaline earth carbonate material, calcined and freed from readily reacting oxid; alkaline earth hydrate, hydrous aluminum silicate, the carbonate being in major proportion, the hydrate in less proportion than the carbonate and the silicate in less proportion than the hydrate, the silicate being not in excess of approximately five percent by weight of the alkaline earth compounds; albuminous material in quantity not to exceed fifteen percent by weight of the alkaline earth materials and silicate, and the addition of liquid, including drying oil, in sufficient quantity to permit application as a coating.

5. The method of producing a coating composition comprising providing an alkaline earth body therefor by kiln burning dolomitic limestone, selecting resonant partially burned material therefrom, moistening, to effect ready hydrate reaction, rumbling to remove such hydrate, grinding the residue, exposing the ground material to carbon dioxid to carbonate any residual hydrate, introducing thereinto a definite minor quantity of alkaline earth hydrate, imparting colloid water suspension properties by mingling therewith hydrous aluminum silicate not in excess of approximately five percent by weight of said ground residue and hydrate, mixing these body-providing ingredients with albuminous material in quantity not to exceed fifteen percent by weight of said body providing ingredients in providing a dry product for packing and shipment, and completing the preparation of the coating composition by mixing uniformly with liquid in sufficient quantity to permit application as a coating.

In witness whereof I affix my signature.

CLARENCE R. REX.